United States Patent [19]

Davis

[11] Patent Number: 5,009,446
[45] Date of Patent: Apr. 23, 1991

[54] SELF ALIGNING COUPLING APPARATUS

[76] Inventor: Darrel B. Davis, 170 Macleay Rd., Sequim, Wash. 98382

[21] Appl. No.: 464,176

[22] Filed: Jan. 12, 1990

Related U.S. Application Data

[63] Continuation of Ser. No. 318,764, Mar. 3, 1989, Pat. No. 4,893,829.

[51] Int. Cl.⁵ .............................................. B60D 1/00
[52] U.S. Cl. ............................ 280/479.2; 280/479.3; 280/477
[58] Field of Search ................ 280/477, 479.1, 479.2, 280/479.3, 456.1, 446.1, 478.1, 482; 244/135 A

[56] References Cited

U.S. PATENT DOCUMENTS

| | | | |
|---|---|---|---|
| 2,488,805 | 11/1949 | Clark et al. | 280/479.3 |
| 3,140,881 | 7/1964 | Antici | 280/479.2 |
| 3,266,818 | 9/1964 | Hill et al. | 280/479.3 |
| 3,521,908 | 7/1970 | Carter | 280/479.1 |
| 3,612,576 | 10/1971 | Marler | 280/479.3 |
| 4,560,184 | 12/1985 | Williams | 280/477 |
| 4,568,099 | 2/1986 | Celentino | 280/479.1 |
| 4,589,672 | 5/1986 | Dickens | 280/479.3 |
| 4,773,667 | 9/1988 | Elkins | 280/479.3 |
| 4,844,497 | 7/1989 | Allen | 280/477 |

FOREIGN PATENT DOCUMENTS

0699702 11/1953 United Kingdom ............. 280/479.3

Primary Examiner—Charles A. Marmor
Assistant Examiner—A. M. Boehler
Attorney, Agent, or Firm—Eugene M. Eckelman

[57] ABSTRACT

A self aligning coupling apparatus for mounting on a towing vehicle or a towed vehicle. Included is an extensible coupler mounted on gimbal axles adapted to tilt up and down and sideways in rotary motion in making a connection to an unaligned vehicle. The coupler telescopes inwardly into a funnel shaped device to complete the alignment as the vehicles are moved closer together.

3 Claims, 2 Drawing Sheets

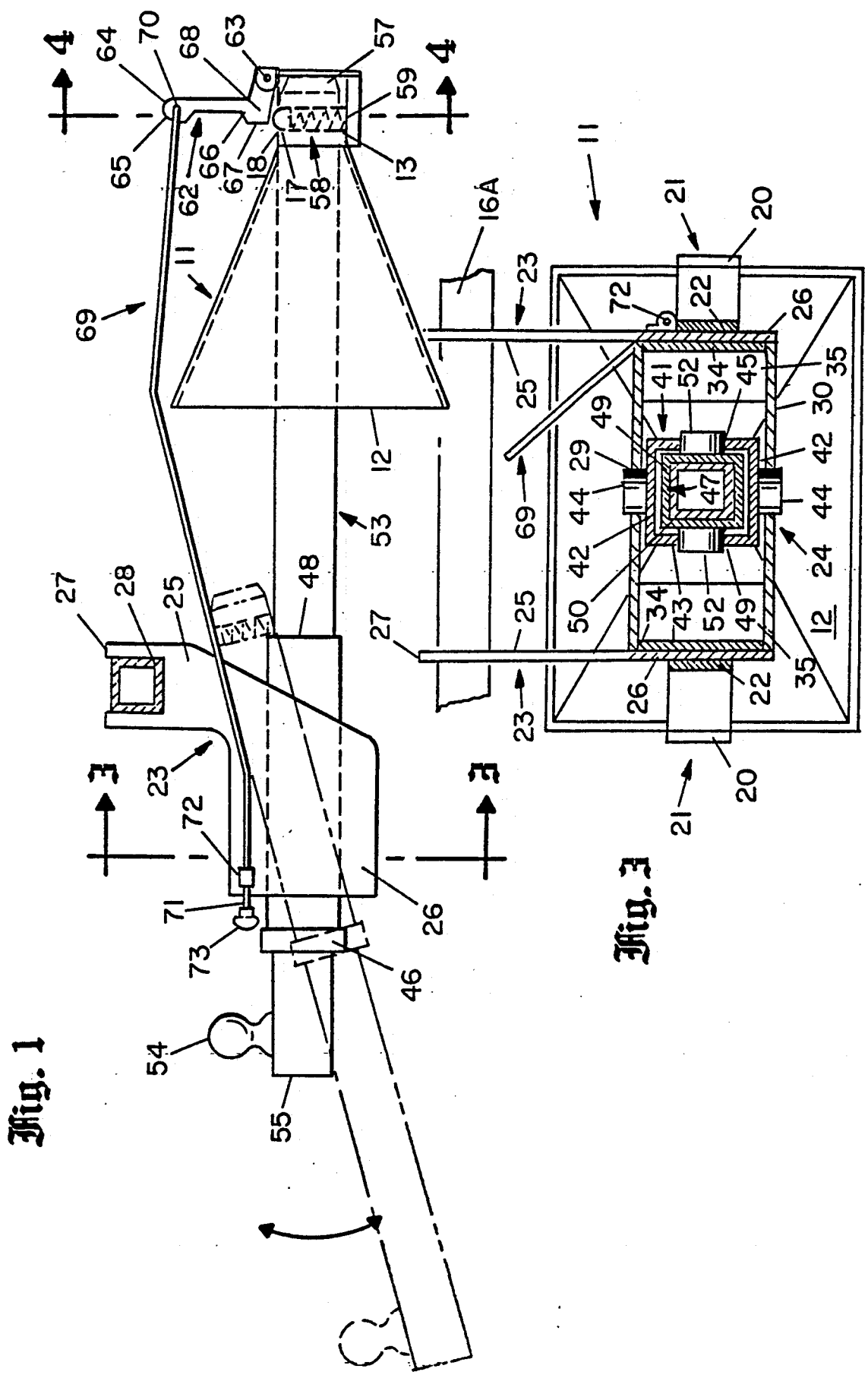

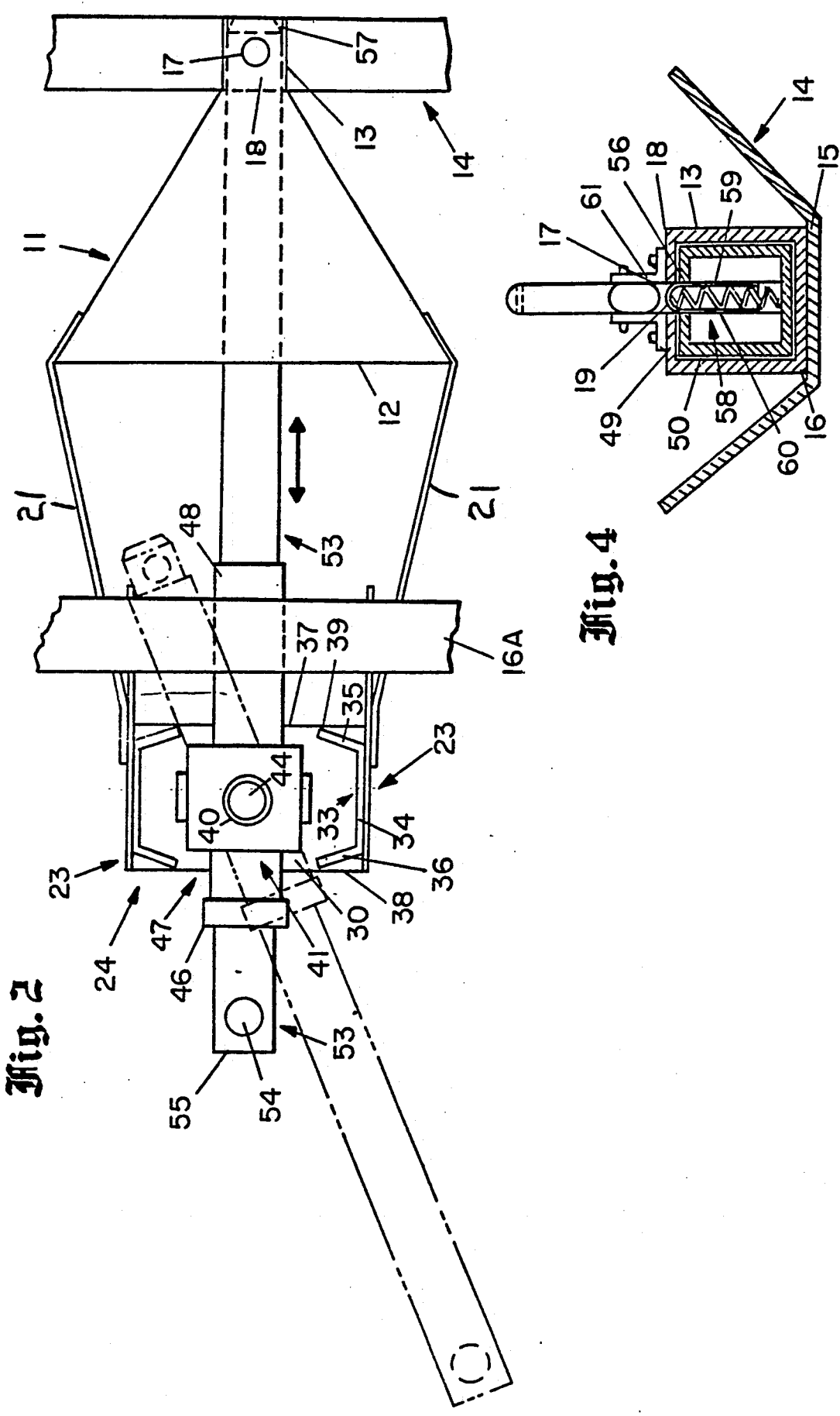

SELF ALIGNING COUPLING APPARATUS

This is a continuation, of U.S. application Ser. No. 07/318,764 filed March 3, 1989, now U.S. Pat. No. 4,893,829.

BACKGROUND OF THE INVENTION

1. Field of the Invention

The present invention relates to aligning devices for coupling a towing or towed vehicle and more particularly an extensible hitch which pivots up and down and sideways in a rotary motion for making a connection to an unaligned vehicle which then telescopes inwardly into a receiving device to complete the alignment as the vehicles are moved closer together.

2. Description of the Prior Art

The standard method of coupling a recreational vehicle, such as a trailer, to a pickup truck is laborous and time consuming. The need to devise a self aligning device to alleviate the problem is of long standing. The difficulty of coupling the two vehicles together concerns the ability of the backing vehicle to approach the towed vehicle in alignment with both hitching connections. This is difficult to do and usually results in angular movement back and forth of the towing vehicle. Subsequently, several patents have been issued disclosing self aligning systems for solving the problem, and including U.S. Pat. Nos. 3,612,576, 3,266,818 and 3,703,243. Each of the three disclosures has similar receiving shaped funnels or housings. Each includes built in track means for guiding a drawbar slidably connected therein. The drawbars are adapted to be coupled angularly to an adjacent hitch of a backing vehicle and then directed along the interior track structure to a locking engagement therein. Otherwise, the means for track guide, rotation of the drawbar, locking mechanism, and stop fixture for limiting outward of the drawbar are different for each system.

In light of the above it is the object of the present invention to illustrate and provide, a distinctly different self aligning apparatus that is efficient, effective and can be manufactured readily and inexpensively.

SUMMARY OF THE INVENTION

In carrying out the principles of the present invention in accordance with a preferred embodiment thereof a self aligning coupling apparatus is adapted to simplify present means for hitching a towed vehicle to a towing vehicle. The apparatus includes a funnel suspended longitudinally beneath a vehicle frame supported by the lower ends of a pair of vertical extending strap attachments to the bottom side of the exit end of the funnel, and an upper end attachment to the frame. Included is a first hole bored through the top side of the exit end for a latch connection. Similarly, the large entrance end is supported horizontally by side attachment of the inner ends of a pair of elongated straps with the outer end extending outward toward the hitch connection. The outer ends of the elongated straps are connected to spaced L-shaped end plates connected to a first housing. End connected between the horizontal portion of the L-shaped end plates is a top and bottom plate which has a second hole extending centrally in alignment through each plate for a rotating connection therein. The vertical portion of the end plates extend outward and upward to a straddled end attachment around the frame. Mounted between the top and bottom plates adjacent to each end plate is an upright stop member consisting of a central wall with side ends connected to spaced diverging side walls extending to opposite side edges of the top and bottom plates. A second housing is loosely mounted within the first housing consisting of spaced horizontal and vertical plates. A gimbal axle mounted on each horizontal plate is rotatably inserted in the second holes disposed in the first housing. The vertical plates of the second housing also include a centrally aligned, third hole through each plate for a rotating connection therein. A sleeve comprising top, bottom and side plates has an outer end loosely secured within the second housing. Slidably enclosed in the sleeve is an elongated coupler extension which has a hitch connection on an outer end and a fourth hole through the top side of an inner end. The coupler is adapted to swing sideways, up and down in rotary motion while entering the funnel entrance and pass into the exit end. There is a spring actuated latch pin mounted in the fourth hole with a tip portion extending thereof that is ejected into the first hole in the exit end to lock the coupler within the funnel. A lever mounted in a pivot secured on the top side of the funnel exit end has a fifth hole in the upper end and an arcuate extension connected on the opposite side of the pivot on the lower end. An elongated drive rod has an inner end fastened in the fifth hole and an outer end slidably enclosed in an eye bolt fastened to the side of an end plate of the first housing. A push-pull knob is mounted on the outer end of the rod that when pulled actuate the lever to plunge the arcuate extension into the first hole and purge the tip portion therefrom.

BRIEF DESCRIPTION OF THE DRAWING

FIG. 1, is an elevated side view of a preferred embodiment of the present invention exclusive of some parts thereof for clarity of structure, FIG. 2, is a plan view of FIG. 1 with some parts removed for clarity of structure, FIG. 3 is an elevated sectional view of an outer portion of FIG. 1 taken along line 3—3, and FIG. 4 is an elevated sectional view of the inner portion of FIG. 1 taken along line 4—4.

DETAILED DESCRIPTION OF THE PRESENT INVENTION

Referring to the drawings in detail and, more particularly to FIG. 1, a self aligning coupling apparatus indicated at 10 is shown in an elevated position as it would be suspended beneath the frame of a towed or towing vehicle. In the view of FIGS. 1 and 2, parts of the apparatus are removed for clarity, but are disclosed and described in FIGS. 3 and 4. Referring again to the drawings a receptacle or funnel 11 has a rectangular front open end 12 and a substantially square and smaller rear end opening 13. The funnel is suspended longitudinally beneath the body frame of a towing or towed vehicle with the front end opening directed toward the hitching end of either vehicle, as will be explained later herein. A strap 14 has a central portion 15 secured to the bottom side 16 of rear end 13 and spaced upper ends, not shown in FIGS. 1, 2 and 4, are secured to the vehicle frame 16A. A hole, indicated as first hole 17, extends through the top side 18 of rear end 13 for a locking connection 19. Attached to vertical side portions of the front end 12 of funnel 11 are inner ends 20 of spaced supporting straps 21 extending horizontally to outer ends 22.

The ends 22 are further attached to the outer sides of end plates 23 of a first housing 24. The end plates 23 are shaped in the form of an L-shaped arm with the vertical portion 25 and horizontal portion 26 extending approximately at right angle to each other. The upper end 27 of the vertical portion 25 is notched for a straddle attachment 28 to the vehicle frame. A rectangular top plate 29 and bottom plate 30 are secured at opposite ends to the inner side horizontal portion 26 of end plate 23.

A stop member 33 is mounted upright between the top and bottom plates adjacent to opposite ends thereof. Stop member 33 is constructed of U-shaped end joined walls consisting of a center wall 34 positioned along side the end plates 23. Connected to the center wall 34 are inner spaced diverging side walls 35 and 36. The side walls 35 extend to the inner side edges 37 of the top and bottom side walls 29 and 30, a predetermined distance 39 from each end plate 23. Likewise, plates 36 extend to the outer side edges 38 of plates 29 and 30 a predetermined distance from each end plate 23. Included in the top and bottom plates 29 and 30 is a second hole 40 extending through each plate intermediate of end plates 23 for a rotational connection therein.

Included loosely within the first housing 24 is a second or gimbal housing 41. The second housing is preferably a square structure with spaced horizontal plates 42 connected at opposite ends to vertical end plates 43. Centrally mounted on each horizontal plate 42 is a gimbal axle 44 adapted to rotate within the second holes 40 located in top and bottom plates 29 and 30 and rotate the second housing sideways between plates 29 and 30. A third hole 45, similar to the second hole 40, extends through a central portion of each vertical plate 43 for a rotational connection therein. Also loosely mounted within the second housing 41 is the outer end 46 of a substantially square shaped sleeve 47. The sleeve has an inner end 48 of horizontal and vertical connected plates 49 and 50 extending beyond the inner side edges 37 of top and bottom plates 29 and 30 for an extension 51. The length of extension 51 can be defined as an approximate length equivalent to the distance between diagonal corners of the first housing end plates at their junction to either of the top and bottom plates. Included is another gimbal axle 52 mounted on each of the vertical walls of sleeve 47 which is inserted for rotation in the third holes 45 in the second housing 41 adapted to tilt the sleeve up and down. More importantly, the gimbal-like structural arrangement disposed within the first housing 24 together with the space allowance between the second housing 41 and first housing 24 and the sleeves 47 and the second housing allows the inner end 48 to swing up and down, and sideways in rotary motion.

There is an elongated coupler 53 slidably enclosed in the sleeve 47 that may be equipped with a ball hitch 54 or a ball socket hitch on an outer end 55 depending on the need to install apparatus 10 on a towing vehicle or a towed vehicle like a trailer. A fourth hole 56 extends through the upper horizontal plate 49 adjacent to an inner end 57 of the coupler. A latch pin 58, which has a central bore 59 therein, is enclosed in the fourth hole 56. Enclosed also in the bore is a compression spring 60 that is attached at a lower end to the bottom of hole 56. When under no axial load the spring projects the latch pin tip 61 out of the hole 56 to a height equivalent to the depth of the first hole 17 horizontal plate 49. As the inner end 57 of the coupler 53 passes into the exit end 13 of funnel 11, the tip of latch pin 61 slips into hole 17 to lock the funnel and coupler together.

The funnel has a lever 62 pivotally hinged in a bracket 63 attached on the rear end 13. The lever includes a fifth hole 64 through the top end 65 and an outward and downward extending arcuate shape extension 66 on the bottom end 67 of the lever. The vertical leg 68 of the arcuate extension is adapted to plunge into the first hole 17 when the lever 62 is pivoted downwardly and the extension drives the latch pin 58 out of said hole whereupon the locked in coupler is released within the funnel.

An elongated rod 69 has an inner end 70 secured in the fifth hole 64 and an outer end 71 that extends to a slidable connection in an eye bolt 72 mounted on the outer side of one of the L-shaped end plates 23. Connected on the outer end 71 of the rod is a push-pull knob or handle 73.

The procedure for coupling apparatus 10 to a towed or towing vehicle can be done quickly and with very little effort. In coupling to a towed vehicle the towing vehicle, such as a pickup truck mounted with the apparatus thereon, backs up to approximately an arms length away from the ball socket end of a trailer draw bar. The knob 73 on the elongated rod 69 extending through the eye bolt 72 is pulled outward to pivot the lever 62 and plunge the leg 68 into the first hole 17. Subsequently, the latch pin tip 61 is driven from the first hole to release the coupler 53 secured in the funnel by latch pin 58. The coupler then may be pulled through the sleeve 47 until the tip 61 of the latch pin abuts against the inner end 48 of the sleeve 47. At this station the outer end 55 of the coupler, equipped with a ball mount 54, is drawn outwardly and swung around until the ball 54 is mounted in the trailer drawbar ball socket. The procedure for fastening the two vehicles together is then practically automatic. The novel feature of the self aligning apparatus 10 is that it instantly corrects the approaching alignment of the towing and towed vehicle. For example if the towing vehicle is backing up at an angle to the towed vehicle while pushing the coupler 53 toward a locking engagement in the funnel 11, the controlling gimbal action of the apparatus will direct the coupler into the funnel. If the coupler is being pushed through sleeve 47 at an angle to the axis of the funnel the portion of the sleeve extending beyond the inner edge of the first housing 24 will glance off of either inner edges of top and bottom plates 29 and 30 and the stop member 33 diverging side plates 35 and 36. The boundary defined thereof will guide the inner end 57 of coupler 53 into funnel 11. The inner end of the coupler on entering into the rear end of the funnel will depress the tip 61 flush with fourth access hole 56 in the coupler inner end 57. Then in passing by hole 56 the latch pin 58 will slip into the first access hole 17 and lock the coupler within the funnel.

I claim:
1. A self-aligning coupling apparatus for mounting on a vehicle comprising:
   a first housing arranged to be secured to the underside of the vehicle,
   a dual gimbal housing supported in said first housing for rotatable adjustment in horizontal and vertical directions,
   an elongated coupler member having front and rearward ends,
   said coupler member being slidably supported in said dual gimbal housing for rotatable and longitudinal adjustable movement with said gimbal housing for connection to a randomly located mating coupler member, a funnel-shaped guide arranged to be secured to the underside of the vehicle, said funnel-shaped guide having a large open front end facing said first housing and a smaller rearward end, said funnel-shaped guide being arranged to slidably receive the rearward end of said coupler member in its rotatably adjusted position and slidably guide the rearward end into the smaller end of the funnel-shaped guide for aligning the elongated coupler member longitudinally with the vehicle, said first housing including guide means therein that direct said coupler member slidably into said open front end of said funnel-shaped guide, and latch means associated with the smaller end of said funnel-shaped guide for securing the elongated coupler member in a coupled and aligned position.

2. The self-aligning coupling apparatus of claim 1 wherein said guide means in said first housing for said coupling member includes an inner sleeve slidably engaged by said coupler member.

3. The self-aligning coupling apparatus of claim 1 wherein said guide means in said first housing for said coupling member includes an inner sleeve having top and bottom edges slidably engaged by said coupler member limiting movement to maintain vertical alignment with said open front end of funnel-shaped guide, and side stops in said first housing limiting movement of said coupling member to maintain horizontal alignment with said opening of said funnel-shaped guide.

* * * * *